(12) United States Patent
Pu et al.

(10) Patent No.: US 9,848,198 B2
(45) Date of Patent: Dec. 19, 2017

(54) DIAGONAL COPY FOR PALETTE MODE CODING

(71) Applicant: QUALCOMM Incorporated, San Diego, CA (US)

(72) Inventors: Wei Pu, San Diego, CA (US); Marta Karczewicz, San Diego, CA (US); Vadim Seregin, San Diego, CA (US); Feng Zou, San Diego, CA (US); Rajan Laxman Joshi, San Diego, CA (US); Joel Sole Rojals, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 316 days.

(21) Appl. No.: 14/875,398

(22) Filed: Oct. 5, 2015

(65) Prior Publication Data
US 2016/0100176 A1     Apr. 7, 2016

Related U.S. Application Data

(60) Provisional application No. 62/060,419, filed on Oct. 6, 2014.

(51) Int. Cl.
*H04B 1/66* (2006.01)
*H04N 19/186* (2014.01)
*H04N 19/182* (2014.01)
*H04N 19/70* (2014.01)
*H04N 19/593* (2014.01)

(52) U.S. Cl.
CPC ......... *H04N 19/186* (2014.11); *H04N 19/182* (2014.11); *H04N 19/593* (2014.11); *H04N 19/70* (2014.11)

(58) Field of Classification Search
CPC .... H04N 19/186; H04N 19/593; H04N 19/70; H04N 19/182
See application file for complete search history.

(56) References Cited

U.S. PATENT DOCUMENTS

| 2015/0186100 A1 | 7/2015 | Tsai et al. |
| 2015/0264365 A1* | 9/2015 | Tsai ...................... H04N 19/94 375/240.03 |
| 2015/0365685 A1* | 12/2015 | Chang .................. H04N 19/176 382/166 |

FOREIGN PATENT DOCUMENTS

| WO | 2015096157 A1 | 7/2015 |
| WO | 2015096812 A1 | 7/2015 |

OTHER PUBLICATIONS

International Preliminary Report on Patentability from corresponding PCT Application Serial No. PCT/US2015/054271 dated Dec. 16, 2016 (28 pages).
Chuang, et al., "CE1-Related: Row-Based Copy Pixel from Neighbouring CU," MediaTek Inc., Jun. 19-26, 2015, (Joint Collaborative Team on Video Coding (JCT-VC) of ITU-T SG 16 WP 3 and ISO/IEC JTC 1/SC 29/WG 11), JCTVC-U0066, 21st Meeting: Warsaw, PL, 8 pp.

(Continued)

*Primary Examiner* — Tat Chio
(74) *Attorney, Agent, or Firm* — Shumaker & Sieffert, P.A.

(57) ABSTRACT

Techniques are described where a current pixel that cannot be palette mode coded in copy above mode and is not coded in a copy index mode is palette mode coded based on a palette index of a diagonal pixel.

29 Claims, 7 Drawing Sheets

(56) References Cited

OTHER PUBLICATIONS

International Search Report and Written Opinion from International Application No. PCT/US2015/054271, dated Apr. 5, 2016, 19 pp.
Laroche G., et al., "SCCE3 Test B.7: Palette Run Coding", JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0085, Jun. 20, 2014, XP030116337, 9 pp.
Laroche, et al., "Non-RCE4: On Palette Prediction Modes Coding," JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-P0116-v4, Jan. 10, 2014, XP030115614, 6 pp.
Pu, et al., "Non-CE6: Syntax Redundancy Fixes for Palette Mode", JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/, No. JCTVC-S0110r1, Oct. 21, 2014, XP030116863, 7 pp.
Pu, et al., "AHG10: Simplification of Palette Based Coding," JCT-VC Meeting; Mar. 27-Apr. 4, 2014; Valencia; (Joint Collaborative Team on Video Coding of ISO/IEC JTC1/SC29/W11 and ITU-T SG.16); URL: http://wftp3.itu.int/av-arch/jctvc-site/,, No. JCTVC-Q0047, Mar. 18, 2014, XP030115936, 4 pp.
Pu, et al., "SCCE3: Test B.12—Binarization of Escape Sample and Palette Index", JCT-VC Meeting; Jun. 30-Jul. 9, 2014; Sapporo; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/,, No. JCTVC-R0065, Jun. 21, 2014, 3 pp.
Seregin, et al., "Non-CE6: Palette Copy above Mode for the First Row," JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/,, No. JCTVC-S0155, Oct. 8, 2014, XP030116927, 5 pp.
Sun, et al., "Non-RCE4: Cross-CU Major Color Index Prediction," JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-P0093-v3, Jan. 9, 2014, XP030115576, 5 pp.
"Working Draft 1 of HEVC Screen Content Coding," MPEG Meeting; Jul. 7-11, 2014; Sapporo; (Motion Picture Expert Group or ISO/IEC JTC1/SC29/WG11), No. N14702, Aug. 26, 2014, XP030021438, 84 pp.
Zhu, et al., "AHG10: Adaptive Scan Order on Palette Based Coding", JCT-VC Meeting, Mar. 27-Apr. 4, 2014, Valencia, (Joint Collaborative Team on Video Coding of ISO/IEC JTC1/SC29/WG11 and ITU-T SG.16), URL: http://wftp3.itu.int/av-arch/jctvc-site/, No. JCTVC-Q0169-v2, Mar. 29, 2014, 4 pp., XP030116116.
Zhu, et al., "Non-SCCE3: Modified Copy above Mode for Palette Based Coding," Fujitsu R&D Center Co., Ltd., Joint Collaborative Team on Video Coding (JCT-VC) of ITU-T SG 16 WP 3 and ISO/IEC JTC 1/SC 29/WG 11, JCTVC-R0078, 18th Meeting: Sapporo, JP, Jun. 30-Jul. 9, 2014, 4 pp.
Bross, et al., "High Efficiency Video Coding (HEVC) text specification draft 10 (for FDIS & Consent)," Jan. 14-23, 2013; (Joint Collaborative Team on Video Coding of ISO/IEC JTC1/SC29/WG11 and ITU-T SG.16), No. JCTVC-L1003_v13; Jan. 30, 2013; 332 pp.
Bross, et al., "High Efficiency Video Coding (HEVC) text specification draft 10 (for FDIS & Consent)," Jan. 14-23, 2013; (Joint Collaborative Team on Video Coding of ISO/IEC JTC1/SC29/WG11 and ITU-T SG.16), No. JCTVC-L1003_v14; Jan. 31, 2013; 334 pp.
Joshi, et al., "High Efficiency Video Coding (HEVC) Screen Content Coding: Draft 1," Jun. 20-Jul. 9, 2014; (Joint Collaborative Team on Video Coding of ISO/IEC JTC1/SC29/WG11 and ITU-T SG.16), No. JCTVC-R1005_v3, Sep. 27, 2014; 362 pp.
Invitation to Pay Additional Fees from International Application No. PCT/US2015/054271, dated Jan. 7, 2016, 7pp.
Response to Invitation to Pay Additional Fees dated Jan. 7, 2016, from International Application No. PCT/US2015/054271, filed on Feb. 4, 2016, 1 pp.
Invitation to Pay Additional Fees from International Application No. PCT/US2015/054271, dated Jun. 30, 2016, 2 pp.
Invitation to Pay Additional Fees from International Application No. PCT/US2015/054271, dated Jul. 11, 2016, 3 pp.
Response to Invitation to Pay Additional Fees dated Jun. 30, 2016 and Jul. 11, 2016, from International Application No. PCT/US2015/054271, filed on Jul. 11, 2016, 1 pp.
Response to Written Opinion dated Apr. 5, 2016, from International Application No. PCT/US2015/054271, filed on Jun. 3, 2016, 26 pp.
Second Written Opinion from International Application No. PCT/US2015/054271, dated Aug. 16, 2016, 11 pp.
Response to Written Opinion dated Aug. 16, 2016, from International Application No. PCT/US2015/054271, filed on Oct. 7, 2016, 26 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

DIAGONAL COPY FOR PALETTE MODE CODING

This application claims the benefit of U.S. Provisional Application No. 62/060,419 filed Oct. 6, 2014, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded.

Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

In general, this disclosure relates to techniques for a video coder (e.g., video encoder or video decoder) to utilize a palette index of a pixel located diagonal to a current pixel as the palette index of the current pixel. For example, if the current pixel cannot be palette mode coded in a copy above mode (e.g., copying index from an above pixel if horizontal scan order or copying from a left pixel if vertical scan order) and the current pixel is not to be palette mode coded in a copy index mode (e.g., copying index from a left or right pixel if horizontal scan order or copying index from above or below pixel if vertical scan order), then the video coder may determine the palette index of the current mode based on the palette index of the diagonal pixel.

In some examples, even if the current pixel cannot be palette mode coded in the copy above mode, the video encoder may signal and the video decoder may receive a syntax element indicating whether the current pixel is coded in the copy above mode or the copy index mode. For this case, although the current pixel cannot be palette mode coded in the copy above mode, if the current pixel is to be palette mode coded using the palette index of the diagonal pixel, the video encoder may signal the syntax element indicating that the copy above mode is to be used for decoding. In this case, the video decoder may determine that the current pixel cannot be decoded using the copy above mode, and may determine that the syntax element indicating that the current pixel is to be decoded using the copy above mode is actually indicating that the current pixel is to be decoded using the palette index of the diagonal pixel.

In one example, the disclosure describes a method of coding video data, the method comprising determining that a current pixel of the video data cannot be palette mode coded in a copy above mode that uses a palette index of a neighboring pixel located perpendicular to the current pixel relative to a scan order, in response to determining that the current pixel cannot be palette mode coded in the copy above mode, determining a palette index of a palette for the current pixel based on a palette index for a pixel of the video data located diagonal to the current pixel, and palette mode coding the current pixel based on the determined palette index.

In one example, the disclosure describes a device for coding video data, the device comprising a memory configured to store palette values of a palette, and a video coder. The video coder is configured to determine that a current pixel of the video data cannot be palette mode coded in a copy above mode that uses a palette index of a neighboring pixel located perpendicular to the current pixel relative to a scan order, in response to determining that the current pixel cannot be palette mode coded in the copy above mode, determine a palette index of the palette for the current pixel based on a palette index for a pixel of the video data located diagonal to the current pixel, and palette mode code the current pixel based on the determined palette index.

In one example, the disclosure describes a device for coding video data, the device comprising means for determining that a current pixel of the video data cannot be palette mode coded in a copy above mode that uses a palette index of a neighboring pixel located perpendicular to the current pixel relative to a scan order, means for determining a palette index of a palette for the current pixel based on a palette index for a pixel of the video data located diagonal to the current pixel in response to determining that the current pixel cannot be palette mode coded in the copy above mode, and means for palette mode coding the current pixel based on the determined palette index.

In one example, the disclosure describes a non-transitory computer-readable storage medium having instructions stored thereon that when executed cause one or more processors of a device for coding video data to determine that a current pixel of the video data cannot be palette mode coded in a copy above mode that uses a palette index of a neighboring pixel located perpendicular to the current pixel relative to a scan order, determine a palette index of a palette for the current pixel based on a palette index for a pixel of the video data located diagonal to the current pixel in response to determining that the current pixel cannot be palette mode coded in the copy above mode, and palette mode code the current pixel based on the determined palette index.

The details of one or more examples of the disclosure are set forth in the accompanying drawings and the description below. Other features, objects, and advantages will be apparent from the description and drawings, and from the claims.

DETAILED DESCRIPTION

Figure 1:
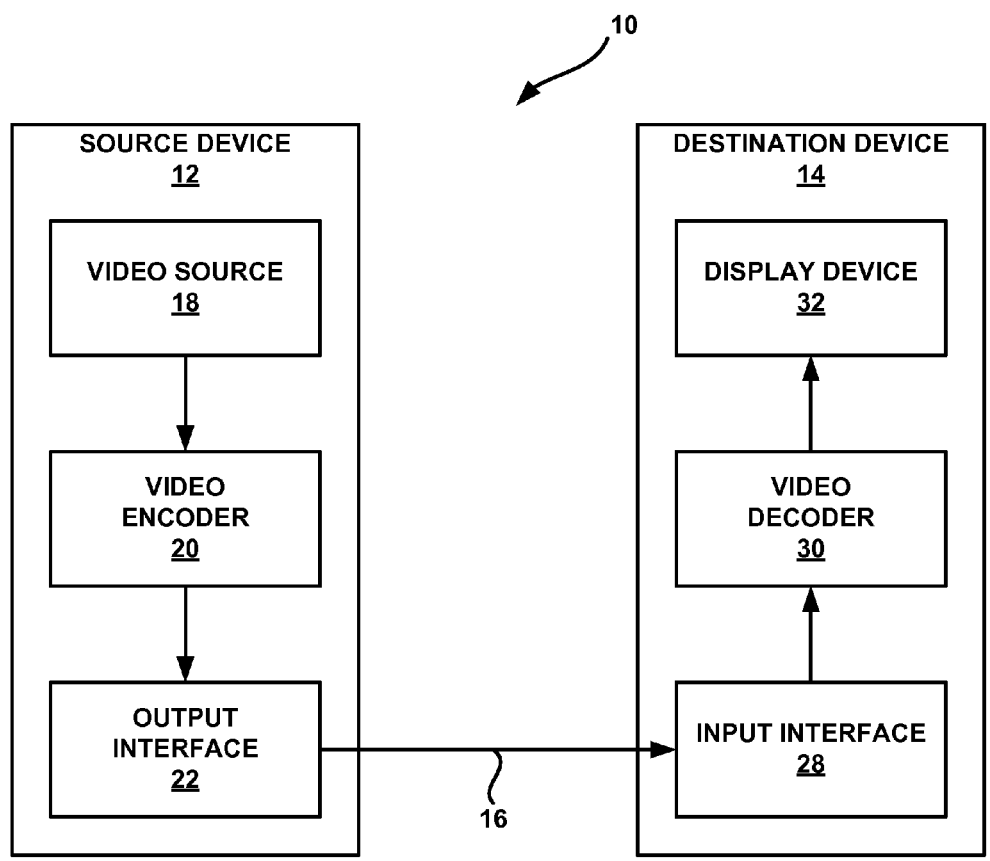
FIG. 1 is a block diagram illustrating an example video coding system that may utilize the techniques described in this disclosure.

This disclosure describes techniques for video coding and compression. In particular, this disclosure describes techniques for palette-based coding of video data (e.g., predicting or coding a block in palette mode). In traditional video coding, images are assumed to be natural images that are continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and features sharp lines and high contrast object boundaries. The assumption of continuous-tone and smoothness may no longer apply, and thus, traditional video coding techniques may be inefficient ways to compress the content.

This disclosure describes palette-based coding, which may be particularly suitable for screen generated content coding; however, the techniques described in this disclosure should not be considered limited to screen generated content coding. Screen generated content coding is described merely for purposes of example. The techniques described in this disclosure may be suitable for other types of video data as well.

In palette coding, assume that a particular area of video data has a relatively small number of colors. A video coder (a video encoder or video decoder) may code (encode or decode) a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette. Thus, in palette mode, a palette may include entries numbered by an index representing color component values that may be used as predictors for block samples or as final reconstructed block samples. Each entry in the palette may contain one color component (e.g., a luma value), two color components (e.g., two chroma values), or three color components (e.g., RGB, YUV, or the like), depending on the particular implementation being used.

In the example above, a video encoder may encode a block of video data by determining a palette for the block, locating an entry in the palette to represent the value of each pixel, and encoding the palette with index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block. The example above is intended to provide a general description of palette-based coding.

In some examples, one or more entries of a palette may be predicted from another palette (e.g., a palette previously used during coding). For example, a palette may include entries that are copied from a predictor palette. A predictor palette may include palette entries from blocks previously coded using palette mode or other reconstructed samples. For each entry in the predictor palette, a binary flag may be included in an encoded video bitstream to indicate whether that entry is copied to the current palette (indicated by flag=1). A series of binary flags for respective palette entries may be referred to as a binary palette prediction vector. Additionally, the current palette may include new entries that are signaled explicitly. The number of new entries may also be signaled.

In some examples, samples in a block may be processed using horizontal raster scanning order. However, other scans such as vertical raster scanning order are also applicable. The scan pattern, either horizontal or vertical, may be snake-like traverse scanning As mentioned above, a palette may contain predicted palette entries, for example, predicted from the palette(s) used to code the previous block(s), and the new entries which may be specific for the current block and are signaled explicitly. The video encoder and video decoder may know the number of the predicted and new palette entries and a sum of them may indicate the total palette size in a block.

In some examples, each sample in a block coded with the palette may belong to one of the 3 modes. For example, pixels in palette mode CU are coded with three run modes, which are detailed as follows:

Escape mode: In this mode, the sample values do not exist in a palette as a palette entry. The quantized sample values are signaled explicitly for all color components. A predetermined index value is signaled using, e.g., truncated binary code, first to indicate that the current pixel is in escape mode, followed by the quantized pixel values. In the state-of-art design, the predetermined index is equal to the maximum palette index plus one.

Copy Above mode: In this mode, the palette entry index for the current sample is copied from the sample located directly above the current sample in a block for horizontal scanning or is copied from the sample located directly to the left of the current sample in a block for vertical scanning According to some aspects, only a syntax element specifying the length of the copy (e.g., run length) is signaled in the bitstream.

Copy Left mode. In this mode, the value of the palette entry index is explicitly signaled using truncated binary code followed by another syntax element specifying how many following pixels in scanning order share the same index as the signaled one (run length). In some instances, Copy Left mode may also be referred to as "Value" mode or Copy Index mode.

As described herein, a palette entry index may be referred as a palette index or simply index. These terms can be used interchangeably to describe techniques of this disclosure.

Also, the above describes examples of the run modes as including copy above mode and copy left mode (copy index mode). For example, in the copy above mode for the horizontal left-to-right or right-to-left scan, the index of the pixel above the current is copied as the index of the current pixel. In the copy above mode, for a vertical top-to-bottom or bottom-to-top scan, the index of the pixel to the left of the current pixel is copied as the index of the current pixel. In this sense, the phrase "copy above mode" does not literally mean that the index of the pixel above is copied in all instances. Rather, for horizontal scan, in the copy above mode, the index of the above pixel is copied, but for vertical scan, even in the copy above mode, the index of the pixel to the left of the current pixel is copied.

In general, the copy above mode means a palette coding mode that uses a palette index of a neighboring pixel perpendicular to the current pixel relative to the scan order. For example, for horizontal scan, the index of the pixel above the current pixel is used in the copy above mode, and the pixel above the current pixel is perpendicular relative to a horizontal scan. For vertical scan, the index of the pixel to the left of the current pixel is used in the copy above mode, and the pixel to the left of the current pixel is perpendicular relative to the vertical scan.

In the copy index mode (or copy left mode) for the horizontal left-to-right scan, the index of the pixel to the left of the current pixel is copied as the index for the current pixel. But, for horizontal right-to-left scan, the index of the pixel to the right of the current pixel is copied as the index for the current pixel for the copy index mode. For vertical top-to-bottom scan, the index of the pixel above the current pixel is copied as the index of the current pixel for copy index mode. For vertical bottom-to-top scan, the index of the pixel below the current pixel is copied as the index of the current pixel for the copy index mode. Therefore, like copy above mode, copy left mode or copy index mode is a general phrase to indicate from which pixel the index is copied, and the phrase copy left mode should not be interpreted to be a literal requirement of using the left pixel.

In general, copy left mode or copy index mode refers to copying an index from the last adjacent neighboring pixel in scanning order. For instance, in copy left mode or copy index mode, the index of the neighboring pixel that is parallel to the scanning order is used to determine the index of the current pixel. As an example, for horizontal scan left-to-right, the pixel to the left of the current pixel is the last adjacent neighboring pixel in scanning order, is parallel to the scan order of left-to-right, and is used to determine the index for the current pixel. For horizontal scan right-to-left, the pixel to the right of the current pixel is the last adjacent neighboring pixel in scanning order, is parallel to the scan order of right-to-left, and is used to determine the index for the current pixel. For vertical scan top-to-bottom, the pixel above the current pixel is the last adjacent neighboring pixel in scanning order, is parallel to the scan order of top-to-bottom, and is used to determine the index for the current pixel. For vertical scan bottom-to-top, the pixel below the current pixel is the last adjacent neighboring pixel in scanning order, is parallel to the scan order of top-to-bottom, and is used to determine the index for the current pixel.

Furthermore, for a snake-like traverse scanning, the horizontal scan may be left-to-right order in the first row, followed by right-to-left in the next row, left-to-right order in the next row, right-to-left order in the next row, and so on. For a snake-like traverse scanning, the vertical scan may be top-to-bottom order in the first column, followed by bottom-to-top in the next column and so on. Accordingly, when the horizontal scan is left-to-right, the copy index mode uses the left pixel, but when the horizontal scan is right-to-left, the copy index mode uses the right pixel. Similarly, when the vertical scan is top-to-bottom, the copy index mode uses the top pixel, but when the vertical scan is bottom-to-top, the copy index mode uses the bottom pixel. In these examples, for copy index mode (or sometimes copy left mode), the palette index of the last adjacent neighboring pixel in scanning order is copied as the palette index for the current pixel To avoid confusion, this disclosure uses the term "first mode" to refer to a palette coding mode that uses a palette index of a neighboring pixel located perpendicular to the current pixel relative to a scan order (e.g., the copy above mode). For example, if the scan order is horizontal, then the neighboring pixel located perpendicular to the current pixel relative to the scan order is the above pixel (e.g., the above pixel is vertical relative to the current pixel, and perpendicular to the horizontal scan). If the scan order is vertical, then the neighboring pixel located perpendicular to the current pixel relative to the scan order is the left pixel (e.g., the left pixel is horizontal relative to the current pixel, and perpendicular to the vertical scan).

This disclosure uses the term "second mode" to refer to a palette coding mode that uses a palette index of a neighboring pixel located in line with the current pixel relative to the scan order (e.g., last adjacent neighboring pixel in scanning order). For example, if the scan order is horizontal, then the neighboring pixel located in line with the current pixel relative to the scan order is the left pixel or right pixel (based on horizontally left-to-right or right-to-left) (e.g., the left or right pixel is horizontal relative to the current pixel, and in line with the horizontal scan). In this case, the second mode is the copy left mode (or copy right mode). If the scan order is vertical, then the neighboring pixel located in line with the current pixel relative to the scan order is the above pixel or the below pixel (based on vertically top-to-bottom or bottom-to-top) (e.g., the above or below pixel is vertical relative to the current pixel, and in line with the vertical scan).

There exist some issues with existing palette coding techniques. For example, a current pixel may be restricted from being palette mode coded using the first mode (e.g., copy above mode) for factors described below. Although the current pixel may be restricted from being palette mode coded (e.g., encoded or decoded) using the first mode, a video encoder may still signal a syntax element indicating whether the current pixel is palette mode coded using the first mode or the second mode (e.g., copy index mode).

The signaling of this syntax element when the current pixel cannot be palette mode coded may be redundant or unnecessary, wasting bandwidth and processing time. For example, the video decoder may be able to determine that the current pixel cannot be palette mode coded using the first mode, but the bitstream would still include the syntax element indicating whether the current pixel is coded using the first mode and the video decoder would still need to parse this syntax element.

In the example techniques described in this disclosure, when the current pixel cannot be palette mode coded using the first mode (e.g., copy above mode), rather than limiting the palette mode coding mode of a current pixel to the second mode (or possibly index mode where the video encoder signals the palette index to the video decoder), the techniques utilize a different palette coding mode. For example, the current pixel may be palette mode coded based on the palette index of a pixel located diagonal to the current pixel (e.g., a pixel not in the same row or column as the current pixel).

In some examples, the video encoder and video decoder may reuse the same syntax element that is used to indicate the first mode or second mode for indicating that the palette index of the diagonal pixel is to be used for determining the palette index of the current pixel. For example, based on various example criteria described below, the video encoder and the video decoder may both determine that a current pixel cannot be palette mode encoded or decoded, respectively, using the first mode. In this case, the video encoder may still signal the syntax element indicating whether the current pixel is encoded using the first mode or the second mode, and more specifically may indicate that the current pixel is encoded using the first mode. However, because the video decoder already determined that the current pixel cannot be decoded using the first mode, the video decoder may determine that the current pixel is to be decoded based on the palette index of the diagonal pixel even though the syntax element indicated that the current pixel is to be decoded using the first mode.

In the techniques described in this disclosure, the video coder (e.g., video encoder or video decoder) may determine that a current pixel of the video data cannot be palette mode coded (e.g., encoded or decoded) in a first mode (e.g., copy above mode) that uses a palette index of a neighboring pixel located perpendicular to the current pixel relative to a scan order and is not to be palette mode coded in a second mode that uses a palette index of a neighboring pixel located in line with the current pixel relative to the scan order (e.g., copy index mode or copy left mode). In response to determining that the current pixel cannot be palette mode coded in the first mode and is not to be palette mode coded in the second mode, the video coder may determine a palette index of a palette for the current pixel based on a palette index for a pixel of the video data located diagonal to the current pixel.

The video coder may palette mode code the current pixel based on the determined palette index. For example, the video coder may determine a palette value of the palette based on the determined palette index for the current pixel, and code the current pixel based on the determined palette value.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in High Efficiency Video Coding (HEVC), using either palette-based coding or non-palette based coding. Non-palette based coding modes may refer to various inter-predictive temporal coding modes or intra-predictive spatial coding modes, such as the various coding modes specified by HEVC Draft 10.

In some examples, the palette-based coding techniques may be configured for use with one or more video coding standards. For example, HEVC is a new video coding standard developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, 12$^{th}$ Meeting of JCT-VC of ITU-T SG16 WP 3 and ISO/IEC JCT 1/SC 29/WG 11, 14-23 Jan. 2013 ("HEVC Draft 10"), available from: http://phenix.int-evey.fr/jct/doc_end_user/documents/12_Geneva/wgll/JCTVC-L1003-v13.zip. Another draft of HEVC is available from http://phenix.int-evry.fr/jct/doc_end_user/documents/12_Geneva/wg11/JCTVC-L1003-v14.zip. The HEVC standard dated April 2015 is available from: http://www.itu.int/rec/T-REC-H.265-201504-I/en. ITU-T H.265, High Efficiency Video Coding (HEVC), is also described in "SERIES H: AUDIOVISUAL AND MULTIMEDIA SYSTEMS, Infrastructure of audiovisual services—Coding of moving video," High Efficiency Video Coding, ITU-T H.265, April 2013.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, wireless communication devices (e.g., mobile computing devices, notebook (e.g., laptop) computers, tablet computers), set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as the HEVC standard mentioned above. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard, or for future generation video coding standards. In some examples, the techniques described in this disclosure for palette-based coding may be applied to encoders and decoders configured to operate according to other video coding standards, or future standards. Accordingly, application of a palette-based coding mode for coding of coding units (CUs) or prediction units (PUs) in an HEVC codec is described for purposes of example.

For instance, with respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized with the intention of reducing the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors (MVs) of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

Video encoder 20 may encode and video decoder 30 may decode one or more blocks of a picture using palette-mode coding techniques. However, it is not necessary for every single block in the picture to be encoded/decoded using palette-mode coding techniques. Some blocks of the pictures may be encoded/decoded using in inter-prediction mode, intra-prediction mode, or intra-block copy mode. It may be possible that all blocks are predicted using palette-mode coding as well.

In some examples, video encoder 20 may encode one or more syntax elements indicating a number of consecutive pixels in a given scan order that have the same pixel value (e.g., same palette index). The string of pixel values may be referred to herein as a "run." Video decoder 30 may obtain the syntax elements indicating a run from an encoded bitstream and use the data for purposes of video coding in accordance with palette coding techniques.

In the coding modes described above, a "run" of values may generally refer to a string of pixel values that are coded together. A run may generally be described with respect to the number of elements included in the run and that are coded together, e.g., the run length. In an example for purposes of illustration, if two consecutive pixels in a given scan order have different values (e.g., different palette indices), the run length is equal to zero. If two consecutive pixels in a given scan order have the same value (e.g., same palette index) but the third pixel in the scan order has a different value, the run length is equal to one, and so on. In some examples, a run may include like-valued pixel values. For example, a run in the Index mode may indicate a string of values having the same escape value (as noted above). In other examples, as noted above, a run length in the Copy from Above mode may indicate a string of pixel values that share the same value as the above-neighboring pixels. In this example, the values within the run may be different, provided the sample value above the position being coded is the same as the current sample (e.g., if a current row has index values 1 2 2 2 4, and the row above the current row has index values 1 2 2 2 4, the run is 4).

In some examples, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 or video decoder 30 may copy index values from the specified neighboring line and from the specified number of entries for the line of the map currently being coded.

However, in some example techniques described in this disclosure, video encoder 20 and video decoder 30 may copy index value for a current pixel from a diagonal neighboring pixel, rather than from an entry immediately above the current pixel. A diagonal neighboring pixel refers to a pixel that is not in the same row and column as the current pixel, but neighbors the current pixel (e.g., above-right pixel, above-left pixel, left-above pixel (which is same as above-right pixel), and left-below pixel).

Video encoder 20 and video decoder 30 may copy index values from diagonally neighboring pixels for a run. In some examples, video encoder 20 and video decoder 30 may copy index values from a diagonally neighboring pixel for only the current pixel of the run, and copy index values from respective top pixels for the other pixels in the run. The location of the diagonally neighboring pixel may be based on the scanning order (e.g., horizontal or vertical scanning order), scanning pattern (e.g., snake-like traverse scanning), and/or scanning direction (e.g., left-to-right scanning, right-to-left scanning, top-to-bottom scanning, or bottom-to-top scanning) In some examples, the palette index value for the current pixel may be based on a default value such that the index value is different from a horizontally neighboring pixel.

For example, video encoder 20 and video decoder 30 may be configured to perform various modes for palette coding. One example is the copy above mode. Because in the copy above mode, the pixel whose palette index is used may be above the current pixel for horizontal scan or left of the current pixel for vertical scan, this disclosure uses the term "first mode" to refer to the copy above mode. For example, in the first mode, the palette index for a current pixel is copied from the palette index of a neighboring pixel that is perpendicular to the current pixel relative to the scan order (e.g., the above pixel is vertical to the current pixel and perpendicular to the horizontal scan order or the left pixel is horizontal to the current pixel and perpendicular to the vertical scan order).

Another example is the copy left or right mode for a horizontal scan of the row that includes the current pixel being palette mode coded. Another example is the copy above or below mode for a vertical scan of the column that includes the current pixel being palette mode coded. In this disclosure, the term "second mode" or copy index mode is used to refer to either the copy left or right mode for a horizontal scan or the copy above or below mode for a vertical scan. For example, in the second mode, the palette index for a current pixel is copied from the palette index of a neighboring pixel that is in line with the current pixel relative to the scan order (e.g., the left or right pixel is horizontal to the current pixel and in line with the horizontal scan order or the above or below pixel is vertical to the current pixel and in line with the vertical scan order). Stated another way, in the second mode, the palette index for a current pixel is copied from the palette index of the last adjacent neighboring pixel in scanning order.

In some examples, a current pixel may not be available to be palette mode coded in the first mode (e.g., copy above mode). For instance, various factors may result in palette mode coding in the first mode not being available for a current pixel.

Figure 2:
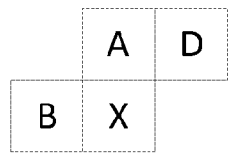
FIG. 2 is a conceptual diagram illustrating a current pixel to code, assuming that the scanning order in the line where the current pixel resides is from left to right.

FIG. 2 is a conceptual diagram illustrating a current pixel to code, assuming that the scanning order in the line where the current pixel resides is horizontally from left to right. As illustrated in FIG. 2, assume that X is the current pixel to code. Also, it is assumed that X's scanning order is from left to right. In the current palette design, if pixel A's palette index is equal to pixel B's palette index (and in some cases, but not limited to all cases, they are not in escape mode), pixel X's mode cannot be 'Copy Above' (e.g., cannot be palette mode coded in the first mode).

The reason is, if X's mode is 'Copy Above', due to the rule that 'Copy Above' does not follow 'Copy Above', pixel B should (e.g., must) be 'Copy Left' mode (e.g., copy index mode). However, by the assumption that X is 'Copy Above' mode, then the index of X equals to A and hence equals to B. Therefore, X should be included into pixel B's 'Copy Left' run.

In the current palette design, if the above case happens, although it can be inferred that X's mode is not 'Copy Above' (i.e. X's mode is 'Index Copy'), video encoder 20 may signal a flag that video decoder 30 receives. For example, video encoder 20 signaling a flag even for the above case is described in "HEVC Screen Content Coding Draft Text 1," JCTVC-R1005, Section 7.3.8.8, palette_mode [xC][yC]) to indicate whether it is 'Copy Above' or 'Copy Left' mode. The JCTVC-R1005 document is by Joshi et. al for the Joint Collaborative Team on Video Coding (JCT-VC) of ITU-T SG 16 WP 3 and ISO/IEC JTC 1/SC 29/WG 11, 18th Meeting : Sapporo, JP, 30 June-9 July 2014, and is available, from http://phenix.int-evey.fr/jct/doc_end_user/current_document.php?id=9471.

As described above, if the neighboring pixel above the current pixel and the last neighboring pixel of the current pixel in scanning order both have the same palette index, then the current pixel is constrained from being palette mode coded in the copy above mode. This constraint on the copy above mode is for a horizontal scan order and the current pixel resides in a line scanned from left-to-right. If the horizontal scan order were right-to-left, then if the neighboring pixel above the current pixel and the last neighboring pixel of the current pixel in scanning order both have the same palette index, then the current pixel is constrained from being palette mode coded in the copy above mode.

For a vertical scan order, if the neighboring pixel to the left of the current pixel and the last neighboring pixel in scanning order both have the same palette index, then the current pixel is constrained from being palette mode coded in the copy above mode. This constraint on the copy above mode is for a vertical line scan order from top-to-bottom. If the vertical line scan order were bottom-to-top, then if the neighboring pixel left of the current pixel and the last neighboring pixel in scanning order both have the same palette index, then the current pixel is constraint from being palette mode coded in the copy above mode. Again, copy above mode refers to copying a palette index of the neighboring pixel that is perpendicular to the scan order (e.g., above for horizontal scan, left for vertical scan) and should not be considered limited to literally requiring that the palette index of the above pixel be copied in all cases.

Therefore, video encoder 20 and video decoder 30 may determine that if a neighboring pixel that is located perpendicular to the current pixel relative to the scan order (e.g., above pixel for horizontal scan or left pixel of vertical scan) has the same palette index as the last neighboring pixel of the current pixel relative to the scan order, then the current pixel cannot be palette mode coded in first mode. However, video encoder 20 may still signal the palette_mode[xC][yC] syntax element indicating whether current pixel is palette mode coded in the first mode (e.g., copy above mode) or the second mode (e.g., copy index mode).

Such signaling of the palette_mode[xC][yC] syntax element, even when video encoder 20 determines that the current pixel cannot be encoded using the first mode may be redundant or unnecessary. For example, the palette_mode [xC][yC] syntax element indicates whether the current pixel is encoded using the first mode or the second mode, but it has already been determined that the first mode is unavailable.

This disclosure describes example techniques to determine a palette index for a pixel. In some examples, a video coder (e.g., video encoder 20 or video decoder 30) may determine a palette index value for a current pixel based on a palette index value for a pixel located diagonal to the current pixel (e.g., the palette index value for a diagonal pixel is copied as the palette index value for the current pixel). In some examples, the video coder may determine a palette index value for a current pixel based on a default value, where the default value is based on the palette index value of a neighboring pixel.

In some examples, video encoder 20 and video decoder 30 may use the palette_mode[xC][yC] syntax elements to identify that the current pixel is encoded or to be decoded based on a palette index of a diagonal pixel. For instance, assume that palette_mode[xC][yC] is a flag (e.g., a zero or a one), and a value of zero indicates that the current pixel is palette mode encoded using the first mode (e.g., copy from above pixel for horizontal scan or copy from left pixel for vertical scan) and a value of one indicates that the current pixel is palette mode encoded using the second mode of copying from last adjacent neighbor pixel in scanning order (e.g., copy left for horizontal left-to-right scan, copy right for horizontal right-to-left scan, copy above for vertical top-to-bottom scan, or copy below for vertical bottom-to-top scan). Also, assume that video encoder 20 determined that the palette index for the current pixel is to be determined from the palette index of the diagonal pixel.

Even if video encoder 20 and video decoder 30 both determine that the current pixel cannot be encoded or decoded in the copy above mode, for the above reasons, video encoder 20 may still signal a value for the palette_mode[xC][yC] syntax element flag indicating that it is a copy above mode and video decoder 30 may parse the palette_mode[xC][yC] syntax element flag as an indicator of copy above mode. In this case, even though the palette_mode[xC][yC] syntax element flag indicates that the current pixel is palette mode coded in the copy above mode, video decoder 30 may determine that the current pixel is actually to be palette mode decoded using the palette index of the diagonal pixel.

In this example, the palette_mode[xC][yC] syntax element does not become redundant when the current pixel cannot be palette mode coded in the copy above mode. Rather, the palette_mode[xC][yC] syntax element indicates that the palette index for the current pixel is from a diagonal pixel.

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In this disclosure, as described above, a new diagonal prediction method to predict palette index is described. This mode can be selected and signaled additionally to already existing 'Copy Above' mode (e.g., the first mode) or 'Copy Left' (also referred to as Copy Index) mode (e.g., the second mode). Additionally or alternatively, the diagonal prediction can be used for some cases where the existing pixel mode signaling is redundant.

For example, although the above example describes reusing the palette_mode[xC][yC] syntax element when this syntax element is redundant, the techniques described in this disclosure may not be so limited. In some examples, rather than reusing the palette_mode[xC][yC] syntax element, the techniques may rely on separate signaling to indicate that the current pixel is to be decoded based on a palette index of a diagonal pixel.

Also, in some cases, just because the current pixel cannot be palette mode coded in the copy above mode does not mean that the current pixel should be palette mode coded based on a palette index of a diagonal pixel. For example, video encoder 20 and video decoder 30 may each respectively determine that a current pixel cannot be palette mode coded in the copy above mode. However, video encoder 20 may determine that the current pixel is to be palette mode coded in an index mode (e.g., where video encoder 20 signals the palette mode index of the current pixel) or is to be palette mode coded in the copy index mode (e.g., copy left or right for horizontal scan or copy above or below for vertical scan). Accordingly, in some examples, video encoder 20 and video decoder 30 may determine a palette index for a current pixel based on a palette index of a diagonal pixel in response to determining that the current pixel cannot be palette mode coded in the copy above mode, is not to be palette mode coded in the copy index mode, and is not to be palette mode coded in the index mode.

As described above, video encoder 20 and video decoder 30 may palette mode encode or decode a current pixel based on a palette index of a diagonal pixel (e.g., determine the palette index of the current pixel based on the palette index of the diagonal pixel). The following describes example implementations (different implementations or implementations that can be used in conjunction with one another) for the diagonal copy techniques described in this disclosure.

In some examples, as described below with respect to FIG. 3, video encoder 20 and video decoder 30 may determine palette indices of the palette for a run of pixels of the current pixel based on respective palette indices of pixels located diagonal to the respective pixels of the run of the current pixel. In some examples, as described below with respect to FIG. 4, video encoder 20 and video decoder 30 may determine palette indices of the palette for a run of pixels of the current pixel based on respective palette indices of pixels that are not located diagonal to the respective pixels of the run of the current pixel.

Figure 3:
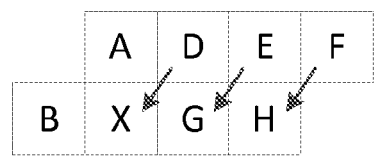
FIG. 3 is a conceptual diagram illustrating an example of diagonal copy for a current pixel, where the scanning order for the current pixel is left to right.

FIG. 3 is a conceptual diagram illustrating an example of diagonal copy for a current pixel, where the scanning order for the current pixel is left to right. In one example as illustrated in FIG. 3, for a pixel X, if its neighboring pixel A and B are not escape pixels, their palette index values are equal, and X is in 'Copy Above' mode, then, X's index is copied from its diagonal pixel D, instead of its above pixel A. FIG. 3 illustrates such an example of diagonal copy method, where the scanning order for X is B→X→G→H . . . For example, in FIG. 3, video encoder 20 or video decoder 30 may determine palette index values for pixels in a run of the current pixel based on respective pixels located diagonal to respective pixels in the run of the current pixel (e.g., for X from D, for G from E, for H from F, and so forth).

FIG. 3 illustrates the case where the scan order is horizontal and left-to-right. In this case, the diagonal pixel is above-right of the current pixel. However, the diagonal pixel need not necessarily be the above-right pixel of the current pixel. For instance, as described in more detail with respect to FIG. 5, for a horizontal scan order that is right-to-left, the diagonal pixel is the above-left pixel of the current pixel.

In general, the diagonal pixel may be a pixel that neighbors the current pixel (e.g., there is no other pixel between the neighboring pixel and the current pixel in the angle in which they neighbor) and is in a different column and row as the current pixel. Examples of the pixel located diagonal to the current pixel include a pixel located above-right of the current pixel based on the scan order being horizontally left-to-right, a pixel located above-left of the current pixel based on the scan order being horizontally right-to-left, a pixel located left-bottom based on the scan order being vertically bottom-to-top, and a pixel located left-top based on the scan order being vertically top-to-bottom.

Figure 4:
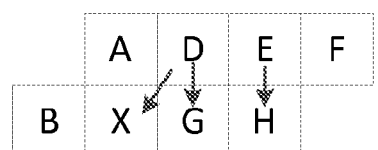
FIG. 4 is a conceptual diagram illustrating another example of diagonal copy for a current pixel.

FIG. 4 is a conceptual diagram illustrating another example of diagonal copy for a current pixel. Instead of always copying as in FIG. 3, it is proposed to allow the first pixel (e.g., only the first pixel) in the run to copy from diagonal. One example is illustrated in FIG. 4. Alternatively or additionally, the palette index value for the pixel X can be copied along the right-to-left-down diagonal (the location above index B not shown in FIG. 4).

In FIG. 4, video encoder 20 or video decoder 30 may determine the palette index value for only the current pixel in a run based on the pixel located diagonal to the current pixel, and may determine palette index values for other pixels in the run based on respective pixels that are not diagonally located to the respective other pixels in the run (e.g., X from D, G from D, H from E, and so forth). As illustrated in FIG. 4, video encoder 20 and video decoder 30 may determine the palette indices for respective pixels in the run of the current pixel based on the respective above pixels. If a vertical scan were used, then the palette indices for respective pixels in the run of the current pixel would be based on respective left pixels.

Accordingly, in the example illustrated in FIG. 3, video encoder 20 or video decoder 30 may be configured to determine palette indices of the palette for a run of pixels of the current pixel based on respective palette indices of pixels located diagonal to the respective pixels of the run of the current pixel. In the example illustrated in FIG. 4, video encoder 20 or video decoder 30 may be configured to determine palette indices of the palette for a run of pixels of the current pixel based on respective palette indices of pixels that are not located diagonal to the respective pixels of the run of the current pixel.

In some examples, video encoder 20 or video decoder 30 may set the palette index value for the pixel X (e.g., current pixel) to the default palette index value without referring to index D. One example of the default palette index value is 0. In some examples, video encoder 20 or video decoder 30 may set the palette index value for the pixel X equal to the default value (such as 0), if the default value is not equal to the index A (or B). Otherwise, video encoder 20 or video decoder 30 may set the palette index value for pixel X equal to a different default value such as, for example, the previous default value plus (such as 1) or minus 1. As one example, video encoder 20 or video decoder 30 may set the palette index value for pixel X equal to 1, if index B equals to 0, and set the palette index value for pixel X equal to 0 if index B does not equal to 0.

In some examples, video encoder 20 or video decoder 30 may set the palette index value for pixel X to the index A (or B) minus 1 if the index A (or B) is not equal to 0. Otherwise, video encoder 20 or video decoder 30 may set the palette index value for pixel X equal to index A (or B) plus 1, or vice-versa, where the check is done for the max index instead of index 0 (i.e., a check that the index plus 1 is not greater than the max index). Generally, the index X can be set as a function of the neighbor palette indices from the left and above.

As described above, the diagonal direction can depend on the scanning pattern. In some examples, the scan order may be the same for all rows or columns of a PU or CU, but scan direction may be different row-to-row or column-to-column.

For example, video encoder 20 or video decoder 30 may utilize some snake-like traverse scanning such as left-to-right order in the first row, followed by right-to-left in the next row, and so on, or top-to-bottom order in the first column, followed by bottom-to-top order in the next column, and so on. For such examples, the direction of the diagonal pixel can be dependent on the scanning order in the row or the row index. In one example, the diagonal direction can be from the left-to-the-right-down for every odd row index, and right-to-the-left-down for the even row indices, or vice-versa.

The techniques described above with respect to horizontal scan may also be applicable to vertical scan. For instance, similar methods described for the horizontal scanning orders can be used for the vertical oriented scanning patterns such as vertical scan, vertical snake-like scan and so forth, where a row is substituted by a column.

Because both horizontal and vertical scans are possible, this disclosure describes the location of pixels and palette coding mode relative to the scan order. For example, the first mode (e.g., copy above mode), as described above, is a palette coding mode that uses a palette index of a neighboring pixel located perpendicular to the current pixel relative to a scan order.

A second mode (e.g., copy index mode) is a palette coding mode that uses a palette index of a neighboring pixel located in line with the current pixel relative to a scan order (e.g., the last adjacent neighboring pixel in the scanning order). If the scan order is a horizontal scan, then in the second mode the palette index of the pixel to the left or right is copied. If the scan order is a vertical scan, then in the second mode the palette index of the pixel above or below is copied.

Figure 5:
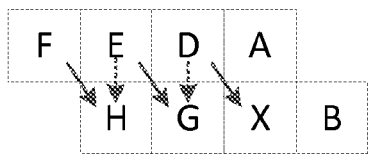
FIG. 5 is a conceptual diagram illustrating neighbor positions for a current pixel if the scanning order is from right to left.

FIG. 5 is a conceptual diagram illustrating neighbor positions for a current pixel if the scanning order is from right to left. If X's (current pixel) scanning order is from right to left, then the relative position between itself (pixel X) and its neighbors is illustrated in FIG. 5. The diagonal copy method proposed above can be directly applied in this case also. For example, similar to FIG. 3, in some examples, the palette indices of the palette for the current pixel and pixels in the run of the current pixel are respective palette indices of diagonal pixels (palette index for pixel X is from pixel D, palette index for pixel G is from pixel E, and palette index for pixel H is from pixel F). In some examples, similar to FIG. 4, the palette indices of the palette for the current pixel is from a diagonal pixel and for pixels in the run of the current pixel, the palette indices are from a pixel not located diagonally (e.g., above pixel). For example, as illustrated with dashed arrows in FIG. 5, palette index for pixel X is from pixel D, palette index for pixel G is from pixel D, and palette index for pixel H is from pixel E.

In some examples, such as those of FIGS. 3, 4, and 5, to determine the palette index value for the current pixel of a block based on a pixel located diagonal to the current pixel, video encoder 20 and video decoder 30 may be configured to determine the palette index value for the current pixel of the block based on the pixel located diagonal to the current pixel based on a determination that palette index values for neighboring pixels is the same (e.g., neighboring pixel A and B are not escape pixel and their index value are equal). In some examples, such as those of FIGS. 3, 4, and 5, to determine the palette index value for the current pixel of a block based on a pixel located diagonal to the current pixel, video encoder 20 and video decoder 30 may be configured to determine the palette index value for the current pixel of the block based on the pixel located diagonal to the current pixel and based on a determination that a Copy Diagonal mode is enabled or a determination that a Copy Above mode is enabled for the current pixel. For example, video encoder 20 and video decoder 30 may utilize a new copy diagonal mode. As another example, if the current pixel is to be in Copy Above mode, video encoder 20 and video decoder 30 may copy the palette index value from a diagonal pixel (e.g., in situations where the index values for neighboring pixels, such as A and B (as one example) is the same, and Copy Above mode is enabled for current pixel X).

In some examples, a normative restriction on video encoder 20 may be imposed that video encoder 20 does not generate a bitstream with 'Copy Above' followed by 'Copy Above' (i.e., if B is in 'Copy Above' mode, the above diagonal copy method is disabled). In such examples, there may be no redundant signaling of the palette_mode[xC][yC] since diagonal copy is not available, and therefore video encoder 20 may not even signal the palette_mode[xC][yC] syntax element if the current pixel cannot be palette mode coded in the first mode.

In some cases, additional constraints may cause the palette index of a pixel to be some other value than the palette index of a diagonal pixel. The above examples described the techniques as applying to a current pixel. To avoid confusion, the following description is based on a second pixel. For instance, for these examples, assume that pixel X is a second pixel.

Video encoder 20 or video decoder 30 may determine that a second pixel cannot be palette mode coded in the first mode (e.g., copy above mode), and may further determine that a palette index of a pixel located diagonally to the second pixel has the same palette index as a neighboring pixel located perpendicular to the second pixel relative to the scan order and a neighboring pixel located in line with the second pixel relative to the scan order. For example, assume pixel X is the second pixel, and video encoder 20 or video decoder 30 may determine that palette index for pixel A equals palette index of pixel B, which equals the palette index of pixel D.

In this case, in response to determining that the second pixel cannot be palette mode coded in the first mode and the palette index of the pixel located diagonally to the second pixel has the same palette index as the neighboring pixel located perpendicular to the second pixel relative to the scan order and the neighboring pixel located in line with the second pixel relative to the scan order, video encoder 20 or video decoder 30 may determine a palette index of the palette for the second pixel based on a default palette index. Video encoder 20 or video decoder 30 may determine a palette value based on the determined palette index for the second pixel, and palette mode code the second pixel based on the determined palette value.

For example, if pixel index A==index B==index D, then video encoder 20 or video decoder 30 assign a predefined value to X in diagonal copy instead of pixel D's index. As an example, if pixel index A==B==D, if D's index equals to 0, video encoder 20 or video decoder 30 may assign X with index 1 in diagonal copy. If D's index does not equal to 0, video encoder 20 or video decoder 30 may assign X with index 0 in diagonal copy, or one or more of the methods for default palette index values are used as described above.

As another example of additional constraints that may cause the palette index of a pixel to be some other value than the palette index of a diagonal pixel, video encoder 20 or video decoder 30 may determine that a second pixel cannot be palette mode coded in the first mode (e.g., copy above mode), and may further determine that the second pixel is located at a block boundary (e.g., boundary of the PU or CU). In this case, in response to determining that the second pixel cannot be palette mode coded in the first mode and is located at the block boundary, video encoder 20 or video decoder 30 may determine a palette index of the palette for the second pixel based on a default palette index. Video encoder 20 or video decoder 30 may determine a palette value based on the determined palette index for the second pixel, and palette mode code the second pixel based on the determined palette value.

For example, in the boundary condition when pixel D collocates with X (i.e., X is the start of a line except for the first line (line index starts from 0)), the diagonal copy method may be disabled or video encoder 20 or video decoder 30 may assign a predefined value different from B's index value using one or more of the methods for default palette index values described above. For instance, video encoder 20 or video decoder 30 may utilize the same techniques as those described above for the case where pixel index A==index B==index D to the case where the second pixel is a boundary pixel.

Figure 6:
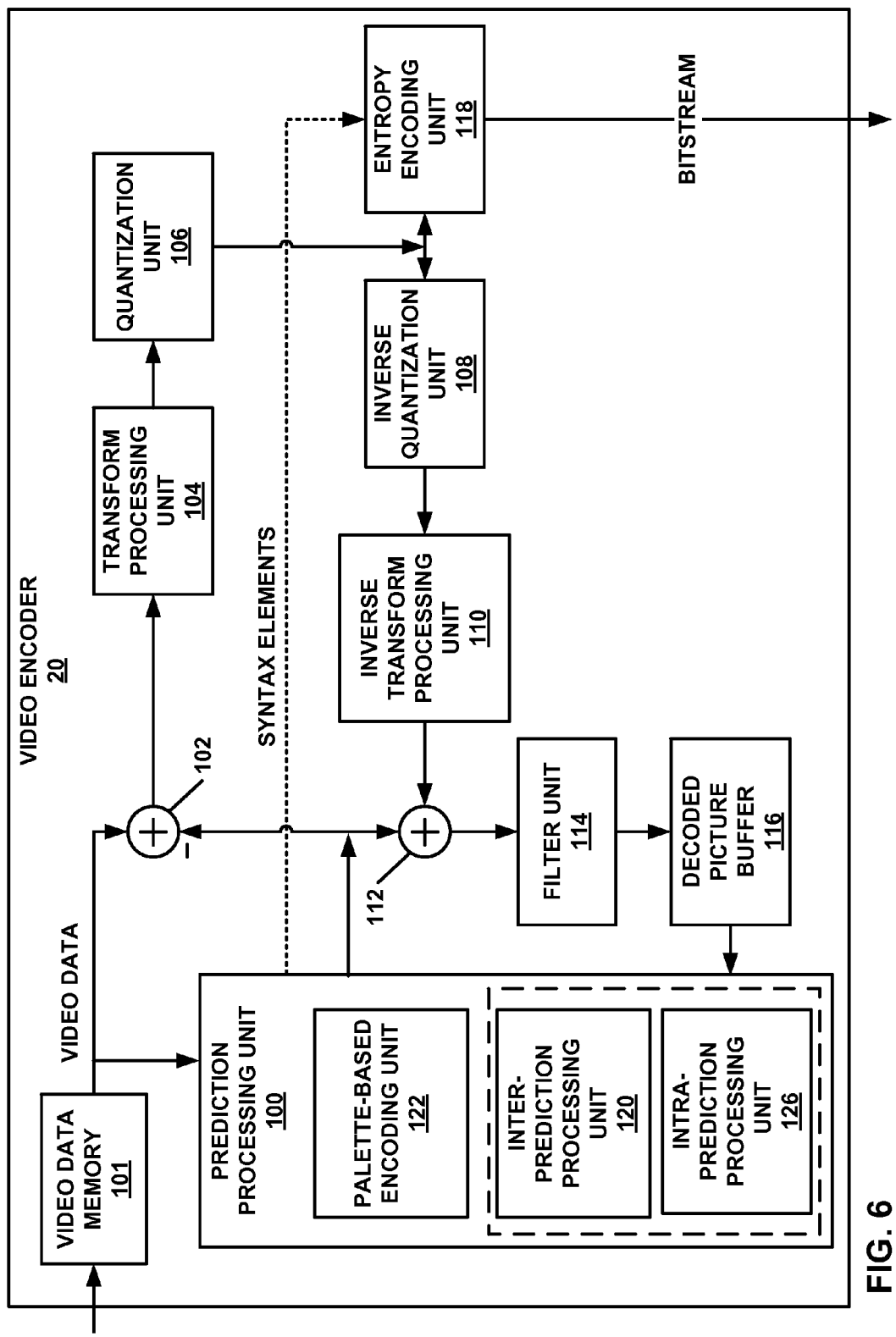
FIG. 6 is a block diagram illustrating an example video encoder that may implement the techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 6, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode) may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Intra-prediction processing unit 126 may generate predictive data for a PU by performing intra prediction on the PU.

The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

According to aspects of this disclosure, palette-based encoding unit 122 may be configured to perform any combination of the techniques for palette coding described in the disclosure for encoding video. For example, palette-based encoding unit 122 may be configured to determine that a current pixel of the video data cannot be palette mode encoded in a first mode (e.g., copy above mode) that uses a palette index of a neighboring pixel located perpendicular to the current pixel relative to a scan order.

In examples where the scan order is a horizontal scan, palette-based encoding unit 122 may determine that the current pixel cannot be palette mode encoded in the copy above mode based on a pixel above the current pixel and a pixel horizontally neighboring the current pixel having the same palette index (e.g., pixel A and B have the same palette index of a palette). In examples where the scan order is a vertical scan, palette-based encoding unit 122 may determine that the current pixel cannot be palette mode encoded in the copy above mode based on a pixel left of the current pixel and a pixel vertically neighboring the current pixel having the same palette index.

For example, in the case where pixel A and B have the same palette index of a palette then pixel X cannot be copy above because if pixel X had the same index as pixel A then it would be part of the run on pixel B because A and B have the same index. Therefore, in some examples, the index of pixel X should be different than that of pixel A, and cannot be palette mode encoded in the copy above mode. Accordingly, when pixel A and B have the same index, palette-based encoding unit 122 may determine that pixel X cannot be palette mode encoded in the copy above mode.

In response to determining that the current pixel cannot be palette mode encoded in the first mode (e.g., copy above mode), palette-based encoding unit 122 may determine a palette index of a palette for the current pixel based on a palette index for a pixel of the video data located diagonal to the current pixel (e.g., the palette index of pixel X is copied from the palette index of pixel D). In addition, palette-based encoding unit 122 may determine palette indices of the palette from a run of pixels of the current pixel based on respective palette indices of pixels located diagonal to the respective pixels of the run of the current pixel. As another examples, palette-based encoding unit 122 may determine palette indices of the palette from a run of pixels of the current pixel based on respective palette indices of pixels that are not located diagonal to the respective pixels of the run of the current pixel (e.g., above or left of the pixels in the run).

Palette-based encoding unit 122 may palette mode encode the current pixel based on the determined palette index. For example, palette-based encoding unit 122 may determine a palette value of the palette based on the determined palette index of the current pixel, and may palette mode encode the current pixel based on the determined palette value. In addition, in some examples, even though the current pixel cannot be palette mode encoded in the first mode, palette-based encoding unit 122 may still cause video encoder 20 to signal a syntax element (e.g., palette_mode[xC][yC]) indicating that the current pixel is palette mode encoded in the first mode. Video decoder 30 uses this information to identify the diagonal pixel because the current pixel cannot be encoded or decoded in the first mode.

Figure 7:
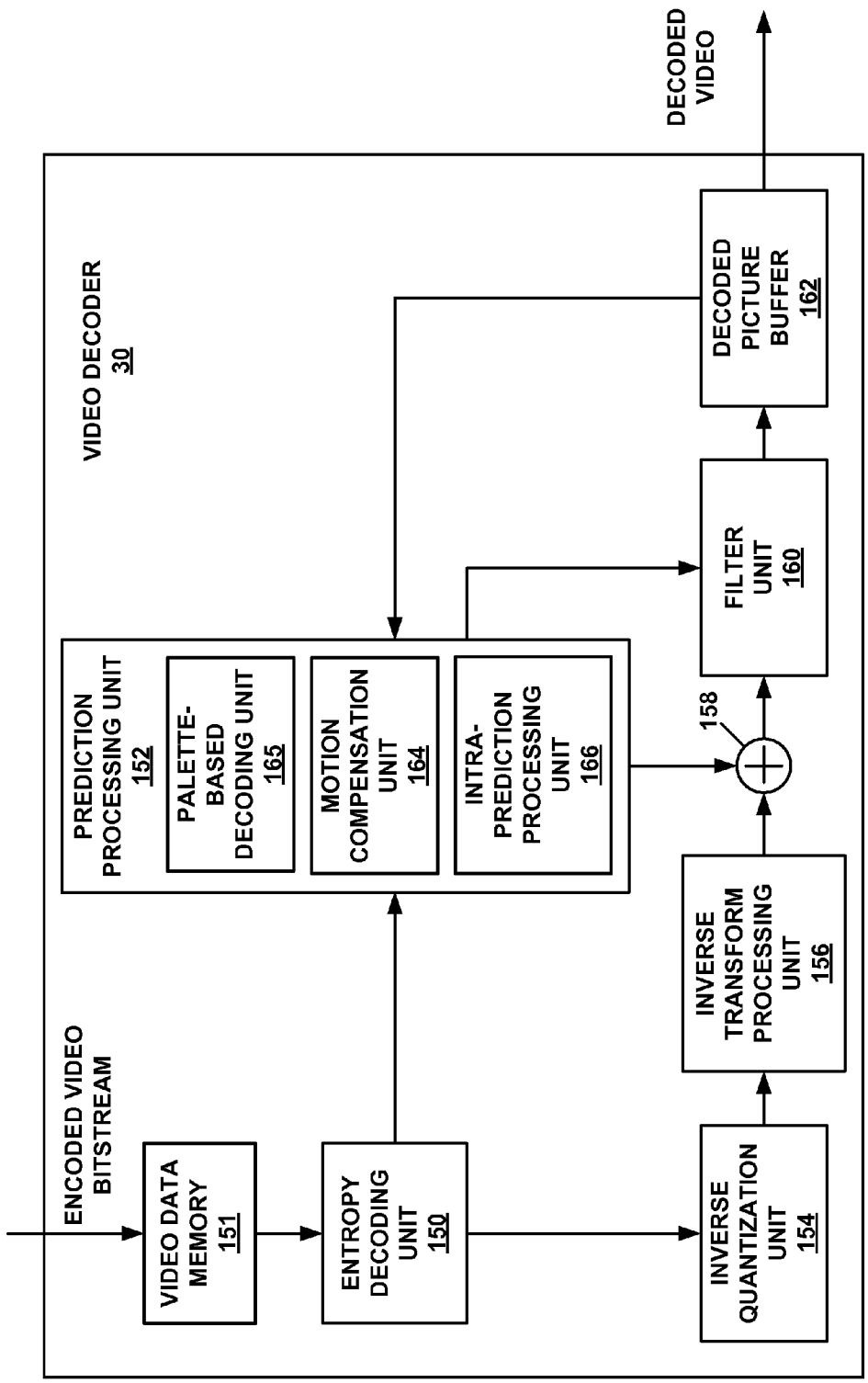
FIG. 7 is a block diagram illustrating an example video decoder that may implement the techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 7, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values associated with entries in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, prediction processing unit 152 decodes the block of video data using a non-palette based coding mode, e.g., such as an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

According to aspects of this disclosure, palette-based decoding unit 165 may be configured to perform any combination of the techniques for palette coding described in the disclosure for decoding video. For example, palette-based decoding unit 165 may be configured to determine that a current pixel of the video data cannot be palette mode decoded in a first mode (e.g., copy above mode) that uses a palette index of a neighboring pixel located perpendicular to the current pixel relative to a scan order.

In examples where the scan order is a horizontal scan, palette-based decoding unit 165 may determine that the current pixel cannot be palette mode decoded in the copy above mode based on a pixel above the current pixel and a pixel horizontally neighboring the current pixel having the same palette index (e.g., pixel A and B have the same palette index of a palette). In examples where the scan order is a vertical scan, palette-based decoding unit 165 may determine that the current pixel cannot be palette mode decoded in the copy above mode based on a pixel left of the current pixel and a pixel vertically neighboring the current pixel having the same palette index.

For example, in the case where pixel A and B have the same palette index of a palette then pixel X cannot be copy above because if pixel X had the same index as pixel A then it would be part of the run on pixel B because A and B have the same index. Therefore, in some examples, the index of pixel X should be different than that of pixel A, and cannot be palette mode encoded in the copy above mode. Accordingly, when pixel A and B have the same index, palette-based decoding unit 165 may determine that pixel X cannot be palette mode decoded in the copy above mode.

In response to determining that the current pixel cannot be palette mode decoded in the first mode (e.g., copy above mode), palette-based decoding unit 165 may determine a palette index of a palette for the current pixel based on a palette index for a pixel of the video data located diagonal to the current pixel (e.g., the palette index of pixel X is copied from the palette index of pixel D). In addition, palette-based decoding unit 165 may determine palette indices of the palette from a run of pixels of the current pixel based on respective palette indices of pixels located diagonal to the respective pixels of the run of the current pixel. As another example, palette-based decoding unit 165 may determine palette indices of the palette from a run of pixels of the current pixel based on respective palette indices of pixels that are not located diagonal to the respective pixels of the run of the current pixel (e.g., above or left of the pixels in the run).

Palette-based decoding unit 165 may palette mode decode the current pixel based on the determined palette index. For example, palette-based decoding unit 165 may determine a palette value of the palette based on the determined palette index of the current pixel, and may palette mode decode the current pixel based on the determined palette value.

In addition, in some examples, even though the current pixel cannot be palette mode encoded in the first mode, palette-based decoding unit 165 may still receive from video encoder 20 a syntax element (e.g., palette_mode[xC][yC]) indicating that the current pixel is to be palette mode decoded in the first mode. In this example, palette-based decoding unit 165 may determine the palette index of the palette for the current pixel based on the palette index for the pixel located diagonal to the current pixel in response to determining that the current pixel cannot be palette mode coded in the first mode and in response to receiving the syntax element indicating that the current pixel is to be palette mode coded in first mode.

Figure 8:
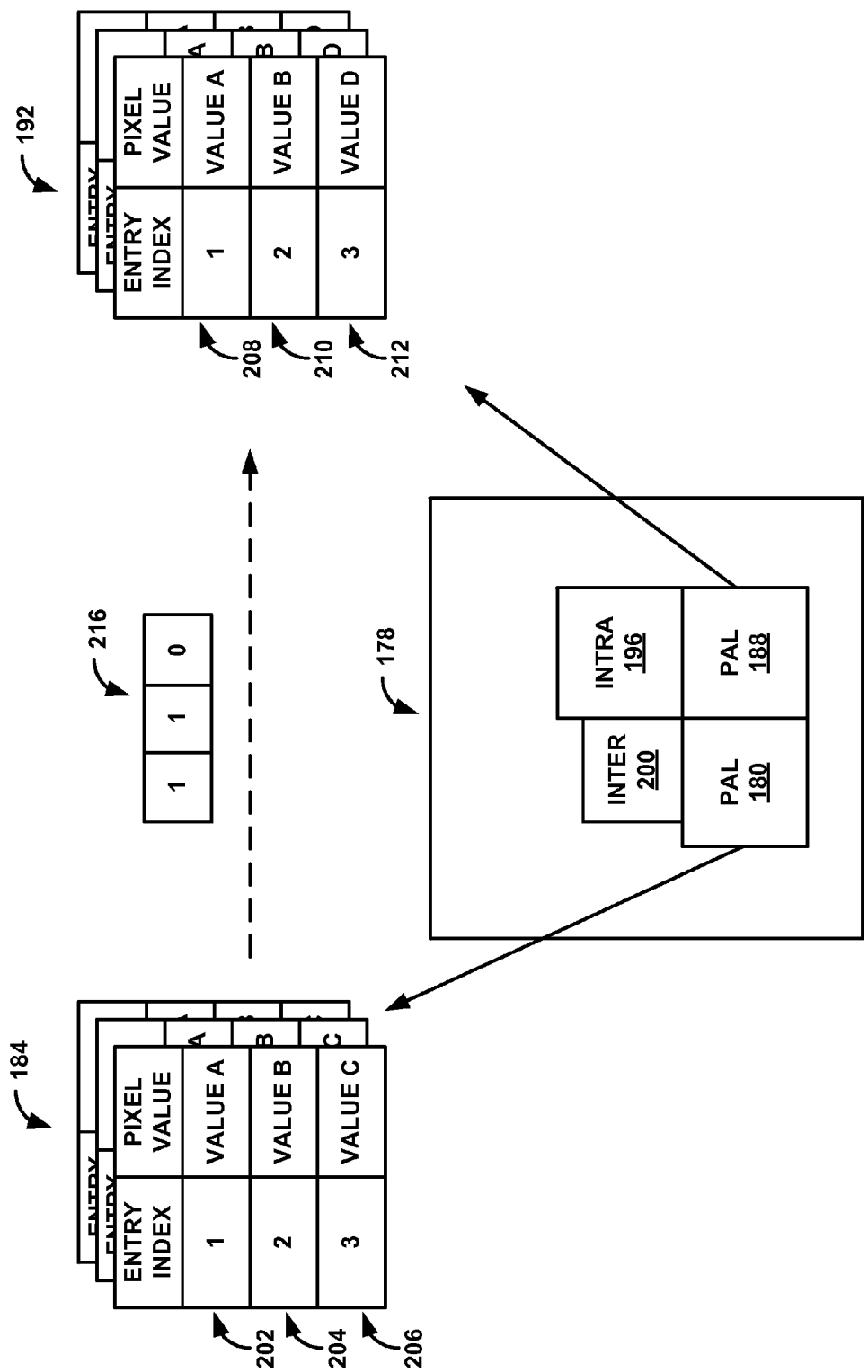
FIG. 8 is a conceptual diagram illustrating an example of determining palette entries for palette-based video coding.

FIG. 8 is a conceptual diagram illustrating an example of determining a palette for coding video data. The example of FIG. 8 includes a picture 178 having a first coding unit (CU) 180 that is associated with first palettes 184 and a second CU 188 that is associated with second palettes 192. First CU 180 and second CU 188 are coded using a palette mode (PAL). In some examples, second palettes 192 may be based on first palettes 184. Picture 178 also includes block 196 coded with an intra-prediction coding mode and block 200 that is coded with an inter-prediction coding mode.

The techniques of FIG. 8 are described in the context of video encoder 20 (FIG. 1 and FIG. 6) and video decoder 30 (FIG. 1 and FIG. 7) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 8. First palettes 184 and second palettes 192 are shown as including multiple palettes. In some examples, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 8, each of first palettes 184 include three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184; however, the techniques described in the disclosure are not so limited, and second palettes 192 may be determined without first palettes 184. For an example where second palettes 192 are determined based on first palettes 184, video encoder 20 and/or video decoder 30 may locate one or more blocks from which the predictive palettes, in this example, first palettes 184 are determined. In some examples, such as the example illustrated in FIG. 8, video encoder 20 and/or video decoder 30 may locate the previously coded CU such as a left neighboring CU (first CU 180) when determining a predictive palette for second CU 188.

In the example of FIG. 8, second palettes 192 include three entries 208-212 having entry index value 1, entry index value 2, and entry index value 3, respectively. Entries 208, 210, 212 relate the index values to pixel values including pixel value A, pixel value B, and pixel value D, respectively. In this example, video encoder 20 may code one or more syntax elements indicating which entries of first palettes 184 are included in second palettes 192. In the example of FIG. 8, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 8, the vector is a Boolean vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

Figure 9:
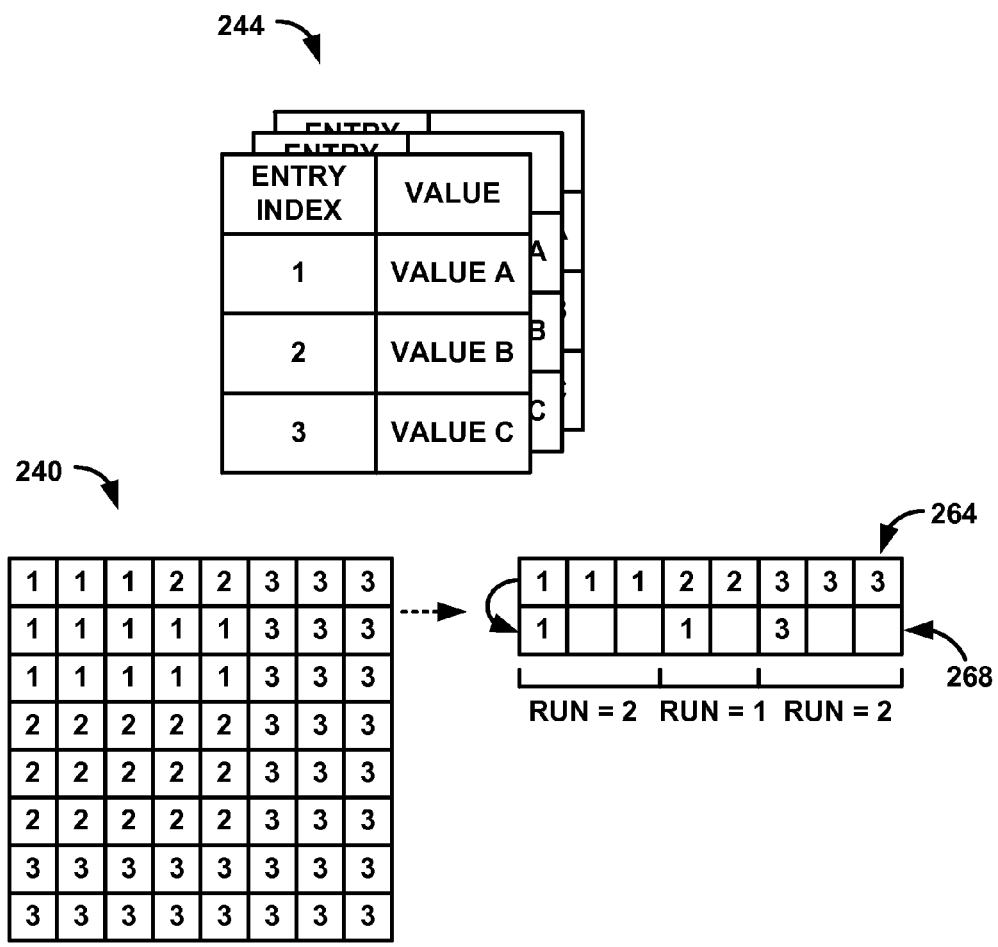
FIG. 9 is a conceptual diagram illustrating an example of determining indices to a palette for a block of pixels

FIG. 9 is a conceptual diagram illustrating an example of determining indices to a palette for a block of pixels, consistent with techniques of this disclosure. For example, FIG. 9 includes a map 240 of index values (values 1, 2, and 3) that relate respective positions of pixels associated with the index values to an entry of palettes 244.

While map 240 is illustrated in the example of FIG. 9 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244.

Video encoder 20 may, in such an example, also encode a palette index (shown in the example of FIG. 9 as values 1-3) to indicate that corresponding pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. For example, video encoder 20 may explicitly code the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

As noted above, runs may be used in conjunction with a Copy Above or Copy Left mode. In an example for purposes of illustration, consider rows 264 and 268 of map 240. Assuming a horizontal, left to right scan direction, row 264 includes three index values of "1," two index values of "2," and three index values of "3." Row 268 includes five index values of "1" and three index values of "3." In this example, video encoder 20 may identify particular entries of row 264 followed by a run when encoding data for row 268 (e.g., Copy Above mode). For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

However, as described in this disclosure, video encoder 20 and video decoder 30 may not be limited to using the palette index value for the top pixel, and may instead use the palette index value of a diagonal pixel (i.e., pixel located diagonally from the current pixel). The diagonal pixel may be based on various factors such as scan order and scan pattern. In some examples, whether the diagonal pixel is to be selected may be based on the palette index values of previous pixels such as the top pixel and the left pixel (assuming a horizontal left-to-right scan). In some examples, video encoder 20 and video decoder 30 may utilize default values for the palette index value.

After encoding the one or more syntax elements indicating the first position of row 264 and the run of two entries (noted above), video encoder 20 may encode, for the fourth and fifth positions in line 268 (from left to right), one or more syntax elements indicating a value of 1 for the fourth position and one or more syntax elements indicating a run of 1 (e.g., Copy Left mode). Hence, video encoder 20 encodes these two positions without reference to another line. In some examples, Copy Left mode may also be referred to as "Value" mode or Copy Index mode.

Video encoder 20 may then encode the first position having an index value of 3 in row 268 relative to upper row 264 (e.g., indicating a copy from upper row 264 and the run of consecutive positions in the scan order having the same index value). Accordingly, video encoder 20 may select between coding pixel or index values of a line relative to other values of the line, e.g., using a run, coding pixel or index values of a line relative to values of another line (or column), or a combination thereof. Video encoder 20 may, in some examples, perform a rate/distortion optimization to make the selection.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order having the same index value. While described with respect to a horizontal scan order, the techniques of this disclosure may also be applied to another scan direction, such as a vertical or diagonal (e.g., 45 degrees or 135 degrees diagonally in block) scan direction.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 6) and/or video decoder 30 (FIGS. 1 and 7), both of which may be generally referred to as a video coder. Likewise, video coding may refer to video encoding or video decoding, as applicable.

Figure 10:
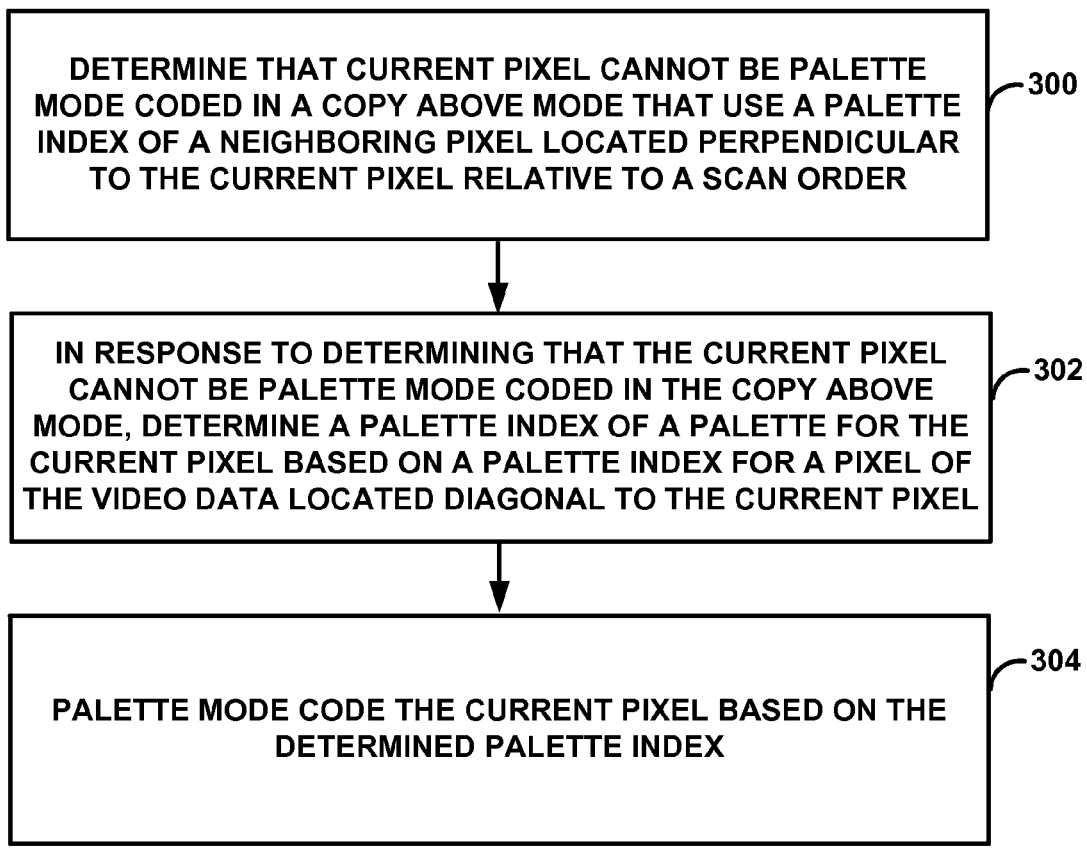
FIG. 10 is a flowchart illustrating a method of coding video data in accordance with one or more examples described in this disclosure.

FIG. 10 is a flowchart illustrating a method of coding video data in accordance with one or more examples described in this disclosure. Video encoder 20 and video decoder 30 may be configured to perform the example illustrated in FIG. 10. Accordingly, the example illustrated in FIG. 10 is described with respect to a video coder (e.g., video encoder 20 or video decoder 30) palette-mode coding (e.g., palette-mode encoding or palette-mode decoding) a current pixel.

The video coder may be configured to determine that a current pixel of the video data cannot be palette mode coded in a copy above mode that uses a palette index of a neighboring pixel located perpendicular to the current pixel relative to a scan order (300). For example, for horizontal scan from left-to-right, if the pixel above the current pixel and to the left of the current pixel have the same index, then if the current pixel were to have the same index as the above pixel, it would be in the run of the left pixel. Meaning that if the current pixel is not the run of the left pixel, the palette index of the current pixel is different than that of the above pixel. Accordingly, for this case, the video coder may determine that the current pixel cannot be palette mode coded in the copy above mode.

In examples where the scan order is a horizontal scan, the video coder may determine that the current pixel cannot be palette mode decoded in the copy above mode based on a pixel above the current pixel and a pixel horizontally neighboring the current pixel having the same palette index (e.g., pixel A and B have the same palette index of a palette). In examples where the scan order is a vertical scan, the video coder may determine that the current pixel cannot be palette mode coded in the copy above mode based on a pixel left of the current pixel and a pixel vertically neighboring the current pixel having the same palette index.

In response to determining that the current pixel cannot be palette mode decoded in the copy above mode, the video coder may determine a palette index of a palette for the current pixel based on a palette index for a pixel of the video data located diagonal to the current pixel (e.g., the palette index of pixel X is copied from the palette index of pixel D) (302). As described above, the diagonal pixel is a neighboring pixel (e.g., there is no pixel inline between the diagonal pixel and the current pixel) and the diagonal pixel is in a different row and column than the current pixel.

If the scan is horizontal left-to-right scan, the diagonal pixel is one pixel position above and one pixel position right to the current pixel. If the scan is horizontal right-to-left scan, the diagonal pixel is one pixel position above and one pixel position left to the current pixel. If the scan is vertical top-to-bottom scan, the diagonal pixel is one pixel position left and one pixel position top to the current pixel. If the scan is vertical bottom-to-top, the diagonal pixel is one pixel position left and one pixel position bottom to the current pixel.

In addition, the video coder may determine palette indices of the palette from a run of pixels of the current pixel based on respective palette indices of pixels located diagonal to the respective pixels of the run of the current pixel. As another examples, the video coder may determine palette indices of the palette from a run of pixels of the current pixel based on respective palette indices of pixels that are not located diagonal to the respective pixels of the run of the current pixel (e.g., above or left of the pixels in the run).

The video coder may palette mode code the current pixel based on the determined palette index (304). For example, the video coder may determine a palette value of the palette based on the determined palette index of the current pixel, and may palette mode code the current pixel based on the determined palette value.

In examples where the video coder is video decoder 30, video decoder 30 may be configured to receive a syntax element indicating that the current pixel is to be palette mode coded in the copy above mode. Also, in response to determining that the current pixel cannot be palette mode coded in the copy above mode and in response to receiving the syntax element indicating that the current pixel is to be palette mode coded in the copy above mode, video decoder 30 may determine the palette index of the palette for the current pixel based on the palette index for the pixel located diagonal to the current pixel. Video decoder 30 may palette mode decode the current pixel based on the determined palette index.

In examples where the video coder is video encoder 20, video encoder 20 signal a syntax element indicting that the current pixel is to be palette mode coded in the copy above mode. Video encoder 20 may palette mode encode the current pixel based on the determined palette index.

The above describes cases where a palette index of a current pixel is based on a palette index of a diagonal pixel. However, in some cases, the palette index of a pixel may not be based on a diagonal pixel when there are some additional constraints.

To avoid confusion, the above examples were described with respect to a current pixel, and the following examples are described with a respect to a second pixel. For example, the video coder may determine that a second pixel cannot be palette mode coded in the copy above mode, and determine that a palette index of a pixel located diagonally to the second pixel has the same palette index as a neighboring pixel located perpendicular to the second pixel relative to the scan order and a neighboring pixel located in line with the second pixel relative to the scan order.

In this example, in response to determining that the second pixel cannot be palette mode coded in the copy above mode and the palette index of the pixel located diagonally to the second pixel has the same palette index as the neighboring pixel located perpendicular to the second pixel relative to the scan order and the neighboring pixel located in line with the second pixel relative to the scan order, the video coder may determine a palette index of the palette for the second pixel based on a default palette index (e.g., a predefined palette index value that is stored by video encoder 20 and video decoder 30). The video coder may determine a palette value based on the determined palette index for the second pixel, and palette mode code the second pixel based on the determined palette value.

As another example, the video coder may determine that a second pixel cannot be palette mode coded in the copy above mode, and determine that the second pixel is located at a block boundary. In this example, in response to determining that the second pixel cannot be palette mode coded in the copy above mode and is located at the block boundary, the video coder may determine a palette index of the palette for the second pixel based on a default palette index, determine a palette value based on the determined palette index for the second pixel, and palette mode code the second pixel based on the determined palette value.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining that a current pixel of the video data cannot be palette mode coded in a copy above mode that uses a palette index of a neighboring pixel located perpendicular to the current pixel relative to a scan order;
   in response to determining that the current pixel cannot be palette mode coded in the copy above mode, determining a palette index of a palette for the current pixel based on a palette index for a pixel of the video data located diagonal to the current pixel; and
   palette mode coding the current pixel based on the determined palette index.

2. The method of claim 1, wherein the scan order comprises a horizontal scan, and wherein determining that the current pixel cannot be palette mode coded in the copy above mode comprises determining that the current pixel cannot be palette mode coded in the copy above mode based on a pixel above the current pixel and a pixel horizontally neighboring the current pixel having the same palette index.

3. The method of claim 1, wherein the scan order comprises a vertical scan, and wherein determining that the current pixel cannot be palette mode coded in the copy above mode comprises determining that the current pixel cannot be palette mode coded in the copy above mode based on a pixel left of the current pixel and a pixel vertically neighboring the current pixel having the same palette index.

4. The method of claim 1, further comprising:
   determining palette indices of the palette for a run of pixels of the current pixel based on respective palette indices of pixels located diagonal to the respective pixels of the run of the current pixel.

5. The method of claim 1, further comprising:
   determining palette indices of the palette for a run of pixels of the current pixel based on respective palette indices of pixels that are not located diagonal to the respective pixels of the run of the current pixel.

6. The method of claim 1, wherein the pixel located diagonal to the current pixel comprises a pixel located above-right of the current pixel based on the scan order being horizontally left-to-right, wherein the pixel located diagonal to the current pixel comprises a pixel located above-left of the current pixel based on the scan order being horizontally right-to-left, wherein the pixel located diagonal to the current pixel comprises a pixel located left-bottom based on the scan order being vertically bottom-to-top, or wherein the pixel located diagonal to the current pixel comprises a pixel located left-top based on the scan order being vertically top-to-bottom.

7. The method of claim 1, further comprising:
   receiving a syntax element indicating that the current pixel is to be palette mode coded in the copy above mode,
   wherein determining the palette index of the palette for the current pixel based on the palette index for the pixel located diagonal to the current pixel comprises, in response to determining that the current pixel cannot be palette mode coded in the copy above mode and in response to receiving the syntax element indicating that the current pixel is to be palette mode coded in the copy above mode, determining the palette index of the palette for the current pixel based on the palette index for the pixel located diagonal to the current pixel, and
wherein palette mode coding the current pixel comprises palette mode decoding the current pixel based on the determined palette index.

8. The method of claim 1, further comprising:
signaling a syntax element indicating that the current pixel is palette mode coded in the copy above mode,
wherein palette mode coding the current pixel comprises palette mode encoding the current pixel based on the determined palette index.

9. The method of claim 1, wherein the current pixel comprises a first pixel, the method further comprising:
determining that a second pixel cannot be palette mode coded in the copy above mode;
determining that a palette index of a pixel located diagonally to the second pixel has the same palette index as a neighboring pixel located perpendicular to the second pixel relative to the scan order and a neighboring pixel located in line with the second pixel relative to the scan order;
in response to determining that the second pixel cannot be palette mode coded in the copy above mode and the palette index of the pixel located diagonally to the second pixel has the same palette index as the neighboring pixel located perpendicular to the second pixel relative to the scan order and the neighboring pixel located in line with the second pixel relative to the scan order, determining a palette index of the palette for the second pixel based on a default palette index;
determining a palette value based on the determined palette index for the second pixel; and
palette mode coding the second pixel based on the determined palette value.

10. The method of claim 1, wherein the current pixel comprises a first pixel, the method further comprising:
determining that a second pixel cannot be palette mode coded in the copy above mode;
determining that the second pixel is located at a block boundary;
in response to determining that the second pixel cannot be palette mode coded in the copy above mode and is located at the block boundary, determining a palette index of the palette for the second pixel based on a default palette index;
determining a palette value based on the determined palette index for the second pixel; and
palette mode coding the second pixel based on the determined palette value.

11. The method of claim 1, further comprising:
determining a palette value of the palette based on the determined palette index for the current pixel,
wherein palette mode coding the current pixel comprises palette mode coding the current pixel based on the determined palette value.

12. A device for coding video data, the device comprising:
a memory configured to store palette values of a palette; and
a video coder configured to:
determine that a current pixel of the video data cannot be palette mode coded in a copy above mode that uses a palette index of a neighboring pixel located perpendicular to the current pixel relative to a scan order;
in response to determining that the current pixel cannot be palette mode coded in the copy above mode, determine a palette index of the palette for the current pixel based on a palette index for a pixel of the video data located diagonal to the current pixel; and
palette mode code the current pixel based on the determined palette index.

13. The device of claim 12, wherein the scan order comprises a horizontal scan, and wherein to determine that the current pixel cannot be palette mode coded in the copy above mode, the video coder is configured to determine that the current pixel cannot be palette mode coded in the copy above mode based on a pixel above the current pixel and a pixel horizontally neighboring the current pixel having the same palette index.

14. The device of claim 12, wherein the scan order comprises a vertical scan, and wherein to determine that the current pixel cannot be palette mode coded in the copy above mode, the video coder is configured to determine that the current pixel cannot be palette mode coded in the copy above mode based on a pixel left of the current pixel and a pixel vertically neighboring the current pixel having the same palette index.

15. The device of claim 12, wherein the video coder is configured to:
determine palette indices of the palette for a run of pixels of the current pixel based on respective palette indices of pixels located diagonal to the respective pixels of the run of the current pixel.

16. The device of claim 12, wherein the video coder is configured to:
determine palette indices of the palette for a run of pixels of the current pixel based on respective palette indices of pixels that are not located diagonal to the respective pixels of the run of the current pixel.

17. The device of claim 12, wherein the pixel located diagonal to the current pixel comprises a pixel located above-right of the current pixel based on the scan order being horizontally left-to-right, wherein the pixel located diagonal to the current pixel comprises a pixel located above-left of the current pixel based on the scan order being horizontally right-to-left, wherein the pixel located diagonal to the current pixel comprises a pixel located left-bottom based on the scan order being vertically bottom-to-top, or wherein the pixel located diagonal to the current pixel comprises a pixel located left-top based on the scan order being vertically top-to-bottom.

18. The device of claim 12, wherein the video coder comprises a video decoder, wherein the video decoder is configured to:
receive a syntax element indicating that the current pixel is to be palette mode coded in the copy above mode;
in response to determining that the current pixel cannot be palette mode coded in the copy above mode and in response to receiving the syntax element indicating that the current pixel is to be palette mode coded in the copy above mode, determine the palette index of the palette for the current pixel based on the palette index for the pixel located diagonal to the current pixel; and
palette mode decode the current pixel based on the determined palette index.

19. The device of claim 12, wherein the video coder comprises a video encoder, and wherein the video encoder is configured to:
signal a syntax element indicating that the current pixel is to be palette mode coded in the copy above mode; and palette mode encode the current pixel based on the determined palette index.

20. The device of claim 12, wherein the current pixel comprises a first pixel, and wherein the video coder is configured to:
    determine that a second pixel cannot be palette mode coded in the copy above mode;
    determine that a palette index of a pixel located diagonally to the second pixel has the same palette index as a neighboring pixel located perpendicular to the second pixel relative to the scan order and a neighboring pixel located in line with the second pixel relative to the scan order;
    in response to determining that the second pixel cannot be palette mode coded in the copy above mode and the palette index of the pixel located diagonally to the second pixel has the same palette index as the neighboring pixel located perpendicular to the second pixel relative to the scan order and the neighboring pixel located in line with the second pixel relative to the scan order, determining a palette index of the palette for the second pixel based on a default palette index;
    determine a palette value based on the determined palette index for the second pixel; and
    palette mode code the second pixel based on the determined palette value.

21. The device of claim 12, wherein the current pixel comprises a first pixel, and wherein the video coder is configured to:
    determine that a second pixel cannot be palette mode coded in the copy above mode;
    determine that the second pixel is located at a block boundary;
    in response to determining that the second pixel cannot be palette mode coded in the copy above mode and is located at the block boundary, determine a palette index of the palette for the second pixel based on a default palette index;
    determine a palette value based on the determined palette index for the second pixel; and
    palette mode code the second pixel based on the determined palette value.

22. The device of claim 12, wherein the video coder is configured to:
    determine a palette value of the palette based on the determined palette index for the current pixel,
    wherein to palette mode code the current pixel, the video coder is configured to palette mode code the current pixel based on the determined palette value.

23. The device of claim 12, wherein the device comprises one of:
    an integrated circuit (IC);
    a microprocessor; or
    a wireless communication device comprising at least one of a display to display the current pixel or a camera to capture the current pixel.

24. A device for video coding, the device comprising:
    means for determining that a current pixel of the video data cannot be palette mode coded in a copy above mode that uses a palette index of a neighboring pixel located perpendicular to the current pixel relative to a scan order;
    means for determining a palette index of a palette for the current pixel based on a palette index for a pixel of the video data located diagonal to the current pixel in response to determining that the current pixel cannot be palette mode coded in the copy above mode; and
    means for palette mode coding the current pixel based on the determined palette index.

25. The device of claim 24, further comprising:
    means for determining palette indices of the palette for a run of pixels of the current pixel based on respective palette indices of pixels located diagonal to the respective pixels of the run of the current pixel.

26. The device of claim 24, further comprising:
    means for determining palette indices of the palette for a run of pixels of the current pixel based on respective palette indices of pixels that are not located diagonal to the respective pixels of the run of the current pixel.

27. A non-transitory computer-readable storage medium having instructions stored thereon that when executed cause one or more processors of a device for video coding to:
    determine that a current pixel of the video data cannot be palette mode coded in a copy above mode that uses a palette index of a neighboring pixel located perpendicular to the current pixel relative to a scan order;
    determine a palette index of a palette for the current pixel based on a palette index for a pixel of the video data located diagonal to the current pixel in response to determining that the current pixel cannot be palette mode coded in the copy above mode; and
    palette mode code the current pixel based on the determined palette index.

28. The non-transitory computer-readable storage medium of claim 27, further comprising instructions that cause one or more processors to:
    determine palette indices of the palette for a run of pixels of the current pixel based on respective palette indices of pixels located diagonal to the respective pixels of the run of the current pixel.

29. The non-transitory computer-readable storage medium of claim 27, further comprising instructions that cause one or more processors to:
    determine palette indices of the palette for a run of pixels of the current pixel based on respective palette indices of pixels that are not located diagonal to the respective pixels of the run of the current pixel.

* * * * *